United States Patent [19]

Robinson et al.

[11] Patent Number: 4,787,180

[45] Date of Patent: Nov. 29, 1988

[54] VIBRATION RESISTANT RUPTURABLE PRESSURE RELIEF MEMBER

[75] Inventors: M. Steven Robinson; Arnold L. Mundt, both of Tulsa, Okla.

[73] Assignee: BS&B Safety Systems, Inc., Tulsa, Okla.

[21] Appl. No.: 150,284

[22] Filed: Jan. 29, 1988

[51] Int. Cl.⁴ .................. E04H 9/00; F16K 17/40; B65D 25/00

[52] U.S. Cl. .................................... 52/1; 52/200; 52/208; 52/98

[58] Field of Search ............. 52/1, 200, 98–100, 52/208; 49/141

[56] References Cited

U.S. PATENT DOCUMENTS

| | | | |
|---|---|---|---|
| 3,005,573 | 10/1961 | Dawson et al. | 220/89 A |
| 3,484,817 | 12/1969 | Wood | 220/89 |
| 4,067,154 | 1/1978 | Fike, Jr. | 52/99 |
| 4,122,595 | 10/1978 | Wood et al. | 29/424 |
| 4,498,261 | 2/1985 | Wilson et al. | 52/1 |
| 4,662,126 | 5/1987 | Malcolm | 52/1 |

*Primary Examiner*—James L. Ridgill, Jr.
*Attorney, Agent, or Firm*—Laney, Dougherty, Hessin & Beavers

[57] ABSTRACT

A vibration resistant rupturable pressure relief member for protecting structure subject to vibration from reaching an overpressure condition. The rupturable pressure relief member is comprised of a rupture panel having an elongated concave-convex bulged portion formed therein and having a score pattern on a side thereof which includes an elongated score extending longitudinally across the bulged portion the ends of which connect with additional divergent scores forming opposing V-shapes.

13 Claims, 2 Drawing Sheets

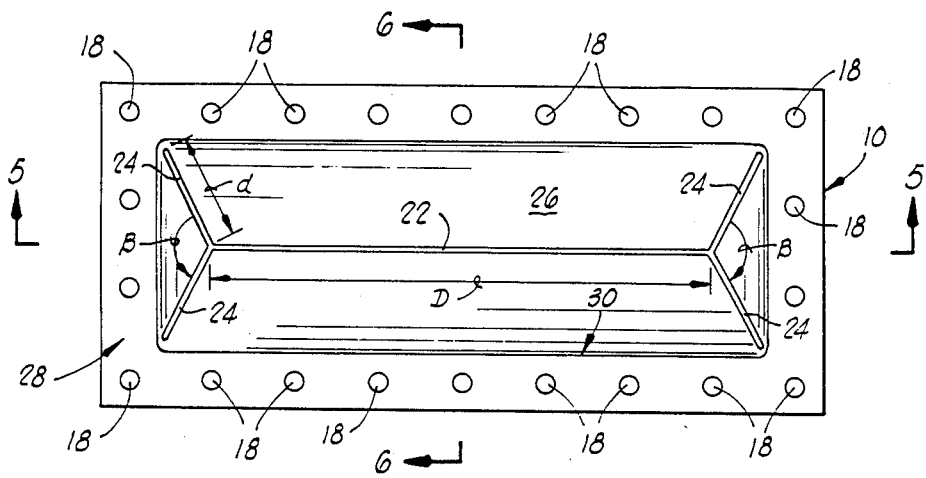
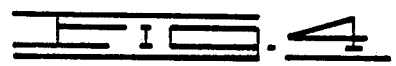
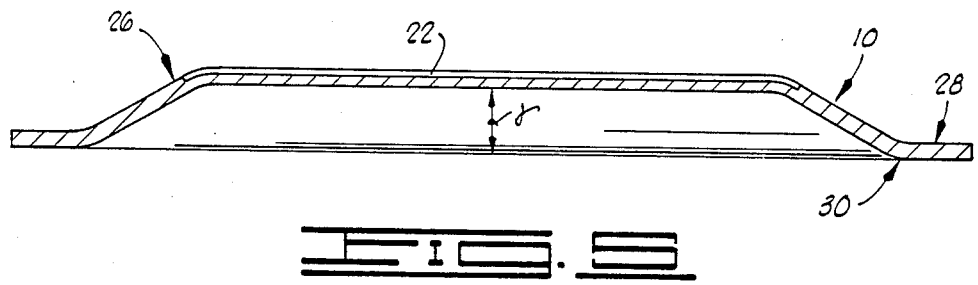
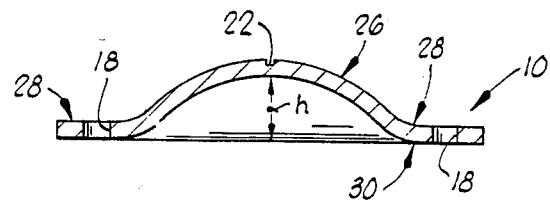
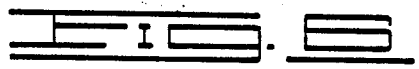

VIBRATION RESISTANT RUPTURABLE PRESSURE RELIEF MEMBER

BACKGROUND OF THE INVENTION

1. Field of the Invention

The present invention relates to a rupturable pressure relief member, and more particularly, to a rupturable pressure relief member which is resistant to vibration and thermal stresses.

2. Description of the Prior Art

A variety of pressure relief devices of the rupturable type have been developed and used heretofore. One form of rupturable pressure relief member commonly utilized for protecting pressure vessels and other systems containing fluids under pressure is the rupture disk. Rupture disks are substantially circular in shape and are supported between a pair of flanges or holders which are in turn connected to a relief connection of a pressure vessel or system. When the pressure within the vessel or system exceeds the design rupture pressure of the rupture disk, rupture occurs causing fluid pressure to be relieved. A great number of rupture disk designs have been developed and used heretofore including single part and composite part disks, prebulged and flat disks, and disks which include one or more parts having lines of weakness created therein by scores, slots, perforations, slits and the like formed on or in a surface thereof. Examples of rupturable pressure relief disks which include lines of weakness formed by scores are disclosed in U.S. Pat. Nos. 3,463,351; 3,484,817; and 4,122,595.

Another form of rupturable pressure relief member utilized heretofore is a burst panel (also called an explosion vent) which provides relief to explosion pressures before structural damage to equipment results. Examples of such burst panels are disclosed in U.S. Pat. Nos. 4,067,154 and 4,662,126. The burst panel disclosed in U.S. Pat. No. 4,662,126 is comprised of two frangible panels disposed in spaced face-to-face relationship with a core of expanded polyurethane foam therebetween which functions to dampen vibrations transmitted to the burst panel. Lines of weakness are formed in the two frangible panels by a plurality of elongated slots formed therein.

While the above-described rupturable pressure relief disks and burst panels are effective in applications where some small amount of vibration is transmitted thereto, they are generally ineffective in applications wherein appreciable vibration is encountered. That is, in applications involving appreciable vibration, premature failure of the disks or panels often results because of the vibration stresses transmitted thereto and exerted thereon without the pressure at which the disks or panels are designed to rupture ever being reached. An example of an application involving such vibration and also involving high thermal stresses in which the above-described prior art rupturable pressure relief devices are inadequate or ineffective is the overpressure protection of supercharged engines, e.g., race car engines. In such engines, the supercharging, i.e., the compressing and concentrating of fuels such as alcohol and air often result in explosions which destroy parts of the supercharger and/or engine and endanger lives.

By the present invention, an improved vibration resistant rupturable pressure relief member for providing overpressure protection to structures which are subject to high vibration and internal fluid pressure and temperature increases, such as supercharged engines, is provided.

SUMMARY OF THE INVENTION

A vibration resistant rupturable pressure relief member for providing pressure relief to a structure subject to high vibration and internal fluid pressure increases is provided. The rupturable pressure relief member is comprised of a single part rupture panel formed of a sheet material and adapted to be sealingly connected over a pressure relief vent in the structure to be protected. The rupture panel includes an elongated concave-convex bulged portion formed therein and a score pattern on a surface of the bulged portion forming lines of weakness therein along which rupture of the panel occurs. The score pattern is comprised of a single elongated score extending longitudinally across the elongated bulged portion of the rupture panel with the ends of the elongated score connecting with the intersecting ends of pairs of divergent additional scores in the bulged portion which form opposing V-shapes.

The score pattern comprising an elongated score extending longitudinally across the elongated bulged portion in the rupture panel connected to opposing V-shapes formed by additional pairs of divergent scores creates lines of weakness in the rupture panel along which rupture occurs when the design rupture pressure is reached, but which resist premature failure due to vibration and thermal stresses.

It is, therefore, an object of the present invention to provide a vibration resistant rupturable pressure relief member.

A further object of the present invention is the provision of a rupturable pressure relief member which reliably relieves overpressure even though vibration and thermal stresses are transmitted to the member prior to reaching the overpressure condition.

Other objects, features and advantage of the present invention will be readily apparent to those skilled in the art upon a reading of the description of preferred embodiments which follows when taken in conjunction with the accompanying drawings.

BRIEF DESCRIPTION OF THE DRAWINGS

FIG. 4 is a top plan view of the rupturable member shown in FIG. 1.

FIG. 5 is a cross-sectional view taken along line 5—5 of FIG. 4.

FIG. 6 is a cross-sectional view taken along line 6—6 of FIG. 4.

DESCRIPTION OF PREFERRED EMBODIMENTS

Figure 1:
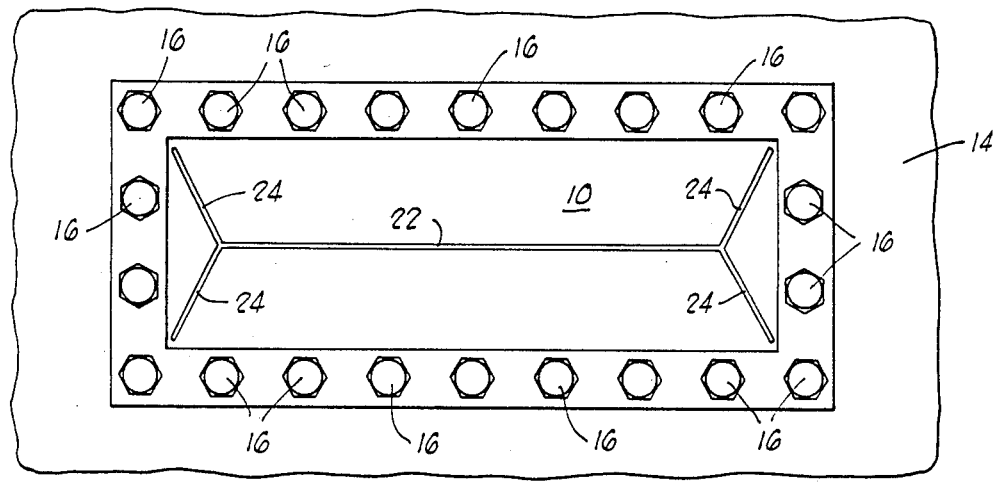
FIG. 1 is a top plan view of the rupturable member of the present invention bolted over a pressure relief vent of a structure.
Figure 2:
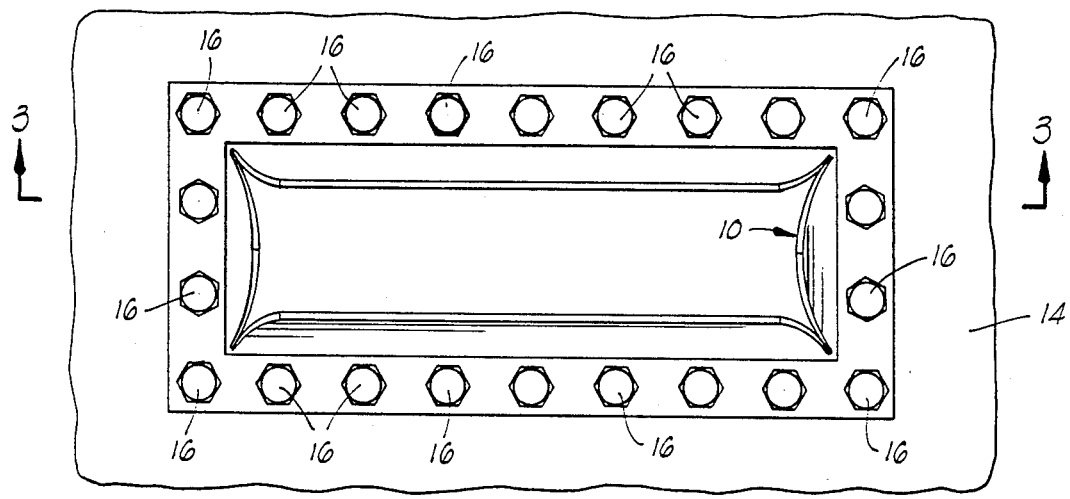
FIG. 2 is a top plan view of the rupturable member of FIG. 1 after rupture of the member has occurred.
Figure 3:
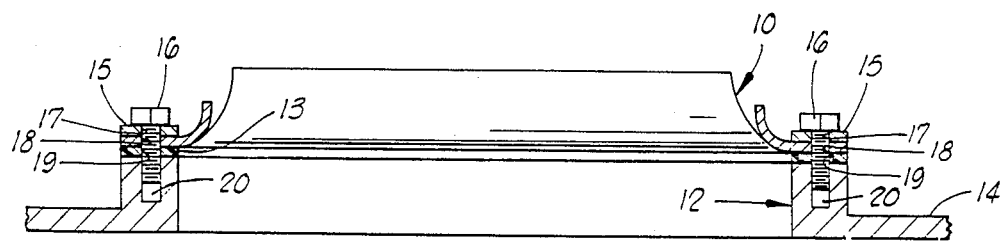
FIG. 3 is a cross-sectional view taken along line 3—3 of FIG. 2.

Referring now to the drawings, the vibration resistant rupturable member of the present invention is illustrated and generally designated by the numeral 10. As shown in FIGS. 1-3, the rupturable member 10 is utilized to sealingly cover and relieve overpressure through a pressure relief vent or opening 12 in a structure 14. The structure 14 can be any of a variety of pressure containing apparatus subject to vibration and internal pressure increases, e.g., the intake manifold of a supercharged internal combustion engine. The member 10 can be sealingly connected to the pressure relief vent 12 in any convenient manner as, for example, by a plurality of bolts 16 which extend through openings 18 in the member 10 and which are threadedly connected to threaded bores 20 in the structure 14. More particularly and as shown in FIG. 3, a rectangular gasket 13 is positioned between the rectangular top surface of the vent 12 and the rupturable member 10. A rectangular flange member 15 is positioned on top of the member 10 and the bolts 16 each extend through coinciding openings 17, 18 and 19 in the flange member 15, the rupturable member 10 and the gasket 13, respectively, to sealingly connect the member 10 over the vent 12.

As illustrated in FIG. 2, when the pressure within the structure 14 which is exerted on the bottom of the rupturable member 10 reaches the pressure at which the rupturable member 10 is designed to rupture, the rupture member 10 tears along lines of weakness formed therein by scores 22 and 24 and opens. That is, the rupture member 10 opens in four parts or petals which are bent outwardly by the release of pressurized fluid contained within the structure 14 therethrough.

Referring now to FIGS. 4 through 6, the vibration resistant rupturable member 10 is shown in detail. The rupturable member 10 is a substantially rectangular rupture panel which includes an elongated substantially rectangular concave-convex portion 26 connected to a flat flange portion 28 by a transition connection 30. The openings 18 are disposed in spaced relationship in the flat flange portion 28 of the member 10, and the scores 22 and 24 are formed on the convex surface of the concave-convex bulged portion 26. However, it is to be noted that the scores 22 and 24 can be formed on either surface of the concave-convex bulged portion 26.

As mentioned previously, the score pattern comprised of the scores 22 and 24 disposed on a surface of the concave-convex bulged portion 26 form lines of weakness in the rupturable member 10 along which the rupturable member 10 tears when caused to open by fluid pressure exerted on the concave side thereof. The particular score pattern illustrated in the drawings results in the rupturable member 10 having resistance to premature failure as a result of vibration and thermal stresses transmitted thereto. Referring particularly to FIG. 4, the score pattern is comprised of the elongated score 22 which extends longitudinally across the elongated substantially rectangular bulged portion 26 and connects at its ends to the intersecting ends of opposing pairs of divergent additional scores 24 in the bulged portion 26 which form opposing V-shapes.

The score 22 preferably coincides with the longitudinal axis of the rupturable member 10 and extends from a point near one side of the bulged portion 26 to a point near the opposite side of the bulged portion. The ends of the elongated score 22 each connect with a pair of the divergent scores 24 which forms a V-shape at the apex of the V-shape. The pairs of divergent scores 24 forming the V-shapes are positioned in the bulged portion 26 at opposite ends thereof and oppose each other, i.e., the intersections of the scores forming the apexes of the V-shapes connect with the ends of the elongated score 22 and the opposite end of each of the scores 24 from the apex end is positioned in a separate corner of the substantially rectangular bulged portion 26. As mentioned above and shown in FIG. 2, when the rupturable member 10 ruptures, it tears along the lines of weakness formed by the scores 22 and 24 whereby four parts or petals are formed and bent in the direction of flow of the pressurized fluid released through the member 10.

In order for the rupturable member 10 to resist vibration and thermal stresses transmitted to it and remain intact until the predetermined design rupture pressure is exerted on the concave side thereof, it has been found that the length of the elongated score 22 (designated "D" in FIG. 4) must be in the range of from about 2.0 to about 10.0 times the length of the longest of the scores 24 (designated "d" in FIG. 4). Preferably, the scores 22 and 24 are straight, the lengths d of the scores 24 are all the same and the length D of the elongated score 22 is 4.0 times the length d of the scores 24. Further, it has been found that the apex angles $\beta$ of the V-shapes formed by each pair of divergent and intersecting scores 24 must be in the range of from about 60° to about 180°. Most preferably, the apex angles $\beta$ are equal and are about 130°.

In order to further illustrate the present invention, the following example is given.

EXAMPLE

A vibration resistant rupturable member 10 is formed of a 3"×6" panel of 0.032" thick aluminum alloy sheet metal. The flat flange portion 28 is approximately 0.5" wide and includes 24 3/16" bolt holes on 5/8" centers. A substantially rectangular concave-convex bulged portion 26 is formed in the panel having a crown height (designated "h" in FIG. 6) of approximately 0.315". The approximate peripheral size of the substantially rectangular bulged portion is $2\frac{1}{8}$" by $5\frac{1}{8}$".

The elongated score 22 is formed in the convex surface of the bulged portion 26 on a line coinciding with the longitudinal axis of the panel. The elongated score 22 is approximately 0.012" deep by 0.032" wide and is 4.200" long. Each of the scores 24 also formed on the convex side of the portion 26 is 0.012" deep by 0.032" wide and has a length of 1.063". The apex angles of the V-shapes formed by the pairs of divergent scores 24 are each 130°.

The above-described rupturable pressure relief member 10 has a design rupture pressure of 190 psig when the pressure is exerted on the concave side of the member. In use, such rupturable member effectively resists premature rupture as a result of high vibration and thermal stresses transmitted to it, and ruptures at the design rupture pressure.

Thus, the vibration resistant rupturable pressure relief member of the present invention is well adapted to carry out the objects and attain the ends and advantages mentioned as well as others inherent therein. While presently preferred embodiments of the invention have been described for purposes of this disclosure, numerous changes in the arrangement of elements of the invention will readily suggest themselves to those skilled in the art, which changes are encompassed within the spirit of this invention as defined by the appended claims.

What is claimed is:

1. A vibration resistant rupturable member for sealingly covering a pressure relief vent of a structure subject to vibration and rupturing at a predetermined pressure level to thereby protect said structure from overpressure comprising a rupture panel adapted to be sealingly connected over said vent having an elongated concave-convex bulged portion formed therein and including a score pattern on a surface of said bulged portion forming lines of weakness therein along which rupture of said panel occurs, said score pattern being comprised of an elongated score extending longitudinally across said bulged portion the ends of which connect with the intersecting ends of pairs of divergent additional scores on said bulged portion which form V-shapes, the length of said elongated score being in the range of from about 2.0 to about 10.0 times the length of the longest of the additional scores forming said V-shapes.

2. The rupture member of claim 1 wherein said scores are formed in the convex surface of said concave-convex bulged portion of said panel.

3. The rupturable member of claim 1 wherein the apex angle of each of said V-shapes formed by said additional scores is in the range of from about 60° to about 180°.

4. The rupturable member of claim 1 wherein said panel and said concave-convex bulged portion are of substantially rectangular peripheral shapes.

5. The rupturable member of claim 4 wherein said elongated score is a straight score coincident with the longitudinal axis of said panel and said additional scores forming said V-shapes are straight scores of equal length.

6. The rupturable member of claim 5 wherein said elongated score is 4.0 times longer than the length of said additional scores.

7. The rupturable member of claim 6 wherein the apex angle of each of said V-shapes formed by said additional scores is of about 130°.

8. A vibration resistant rupturable member for sealingly covering a pressure relief vent in a structure subject to vibration and sudden internal pressure and temperature increases and rupturing at a predetermined pressure level to thereby protect said structure from overpressure comprising a rupture panel adapted to be sealingly connected over said vent having a concave-convex bulged portion of substantially rectangular peripheral shape formed therein and including a score pattern on the surface of said bulged portion forming lines of weakness therein along which rupture of said panel occurs, said score pattern being comprised of an elongated score extending longitudinally across said bulged portion with the ends of said elongated score connecting with the intersections of the ends of pairs of divergent additional scores on said bulged portion which form opposing V-shapes, the length of said elongated score being in the range of from about 2.0 to about 10.0 times the length of the longest of said additional scores forming said V-shape.

9. The rupture member of claim 8 wherein said scores are formed in the convex surface of said concave-convex bulged portion of said panel.

10. The rupture member of claim 8 wherein the apex angle of each of said V-shapes formed by said additional scores is in the range of from about 60° to about 160°.

11. The rupture member of claim 8 wherein said elongated score is a straight score coincident with the longitudinal axis of said concave-convex bulged portion and said additional scores forming said V-shapes are of equal length.

12. The rupture member of claim 11 wherein said elongated score is 4.0 times longer than the lengths of said additional scores.

13. The rupture member of claim 12 wherein the apex angle of each of said V-shapes formed by said additional scores is about 130°.

* * * * *